United States Patent

Koshida et al.

[11] Patent Number: 6,013,345
[45] Date of Patent: Jan. 11, 2000

[54] CARD, BONDING JIG, AND CARD READER-WRITER

[75] Inventors: Yoshinori Koshida; Shusaku Tanabe; Takahiro Oda, all of Tokyo, Japan

[73] Assignee: Oki Electric Industry Co., Ltd., Tokyo, Japan

[21] Appl. No.: 08/702,515

[22] PCT Filed: Dec. 25, 1995

[86] PCT No.: PCT/JP95/02656

§ 371 Date: Oct. 24, 1996

§ 102(e) Date: Oct. 24, 1996

[87] PCT Pub. No.: WO96/20458

PCT Pub. Date: Jul. 4, 1996

[30] Foreign Application Priority Data

Dec. 28, 1994 [JP] Japan ......................................... 327788

[51] Int. Cl.[7] .............................. B32B 5/00; G06K 19/00
[52] U.S. Cl. ............................. 428/78; 428/195; 428/209; 428/694 R; 428/900; 428/913; 346/135.1; 361/737
[58] Field of Search .............................. 428/78, 195, 201, 428/209, 411.1, 692, 694 R, 900, 913; 346/135.1; 361/737

[56] References Cited

U.S. PATENT DOCUMENTS 5,471,044  11/1995  Hotta et al. ............................. 235/487

FOREIGN PATENT DOCUMENTS

| 2-17447 | 2/1990 | Japan . |
| 2-57396 A | 2/1990 | Japan . |
| 5-101230 A | 4/1993 | Japan . |
| 5-262033 A | 10/1993 | Japan . |
| 5-278332 A | 10/1993 | Japan . |
| 07093498 A | 4/1995 | Japan . |

*Primary Examiner*—Marie Yaminitzky
*Attorney, Agent, or Firm*—Venable; Robert J. Frank; Catherine M. Voorhees

[57] ABSTRACT

Display functions are added freely to a card a with high printing quality by bonding a rewrite tape 7 onto a specified position of the card 1, i.e., at a position where the rewrite tape 7 is bonded onto a back area of a face of the card on which an IC card contact 3 is provided, and avoiding a back area 3' corresponding to the IC contact 3, an area 2 of magnetic stripes or back area 2' corresponding to the area 2, and a back area 4' corresponding to embossment 4.

2 Claims, 6 Drawing Sheets

CARD, BONDING JIG, AND CARD READER-WRITER

TECHNICAL FIELD

This invention relates to a card, a jig, and a card reader-writer. The card is characterized by specifying an area for bonding heat reversible recording medium, particularly a band-shaped heat reversible recording medium (hereafter referred to as "Rewrite Tape") where it is possible to repeatedly write information. The jig is supplied to bond a rewrite tape on the card. The card reader-writer is suitable to read and write the electronic information to semiconductor devices such as IC, memory, etc., in the card, and to write and erase the information in rewrite tapes.

BACKGROUND TECHNOLOGY

Cards having a display using a heat reversible recording material are known where it is possible to repeatedly write the information. Such a card is referred to as "Rewrite Card". Usually, a rewrite layer is formed on a base material consisting of polyethylene, aluminum, etc. After a protecting layer is formed on the rewrite layer, the prescribed design will be printed in an area (hereafter referred to as "Non-Display") from which the display is removed. The card is made in the above method.

Such cards have a gap of several microns or so between a non-display section where the prescribed design is printed and a display section where the design is not printed. That is, the display is more concave than the non-display. For this reason, the contact of the thermal head is incomplete in the vicinity of the boundary (hereafter referred to as "Edge") between the two sections. As a result, a problem occurs in that a heat gradient is generated when information is written or erased in the display. That is, there was a problem in that the printing quality of the edge is low while the printing quality of the display is high in the vicinity of the center.

Also, when such cards reach the limits of the frequency in use of their displays, it is necessary to replace the cards themselves with new ones. Accordingly, the replacement poses a problem in that the economic burden becomes heavy.

DISCLOSURE OF INVENTION

The first invention is a card where a band-shaped heat reversible recording medium is attached to the specified bonding position, and is characterized by a bonding position on the back of the face where a contact for semiconductor devices is provided, i.e., is in a position away from an area corresponding to this contact, a magnetic stripe area or a back area corresponding to this magnetic stripe area, and a back area corresponding to an embossment.

In the first invention, a band-shaped heat reversible recording medium is attached to the bonding position of a card and the display is convex from the surface of the card. Therefore, it is possible to better the contact between the display and the thermal head of the card reader-writer, particularly when the card is convex at the specified height even if the card is deformed, it will be possible to do so. Also, a flat face is selected by specifying the above bonding position. Accordingly, it is possible to prevent a gap from being formed between the display and the thermal head. In addition, display functions can be added freely in cards without any change of these cards which are presently in widespread use.

The second invention is characterized in that the bonding position of heat reversible recording media abuts the back area corresponding to the contact for semiconductor devices and extends along the longitudinal direction of the card in the card of the first invention.

In the second invention, it is possible to reduce the difference between the bias quantity of the contact for semiconductor devices of cards and that of band-shaped heat reversible recording media by further specifying the bonding position of these media.

The third invention is characterized by the heat reversible recording medium having a heat reversible recording layer on an upper layer of a base material and an adherent bonding layer on a lower layer of the base material in the card of the first invention, and wherein the heat reversible recording medium is attached to the flat bonding face of the card so that this medium is convex.

In the third invention, it is possible to better the contact between the band-shaped heat reversible recording medium and the thermal head by attaching this medium to the flat bonding face of the card so that the medium is convex. Also, when the information is erased or printed in the card, it is possible to prevent the heat from being lost from the edge. Therefore, it is possible to prevent the heat gradient from occurring. The medium can be torn readily from the flat bonding face of the card, because this medium is convex on the card.

The fourth invention is characterized by a heat reversible recording medium that is elastic in the card of the first invention.

In the fourth invention, the band-shaped heat reversible recording medium possesses a damping function, because it is elastic. Accordingly, it is possible to prevent the card and the thermal head from being unbalanced by the warp, torsion, etc., of the card.

The fifth invention is a jig for bonding the heat reversible recording medium on the card, and is characterized by a jig having first and second plates which is fixed in a state where the plates are matched with each other so that the pressing means of the second plate is inside. In the case of the first plate, a notch is provided in accordance with the position for bonding this medium on the card. Also, the second plate has the pressing means for crimping the medium.

In the fifth invention, the card is put between the first and the second plates in a state where the bonding face of the card is upward, and the band-shaped heat reversible recording medium is applied to the card along the notch. Therefore, the medium can be fixed temporarily at the specified position of the card. Also, after the temporary fixation, the card is pulled out between the first and the second plates, and the card is put between them in a state where the bonding face of the card is downward. Accordingly, the above medium can be bonded firmly to the card in a state where its surface is flat, because the pressing means rubs against this medium.

The sixth invention is a jig for bonding the heat reversible recording medium on the card, and is characterized by, that a jig having a first plate formed integrally, and a notch is provided in accordance with the position for bonding this medium on the card, and a second plate pressing means for crimping the medium, wherein the first and second plates are fixed in a state where they are folded so that the pressing means of the second plate is inside.

The sixth invention offers such bonding jig which can be manufactured simply with a small number of parts at a low cost, and the sixth invention offers such bonding jigs.

The seventh invention is characterized by pressing means being a roller in the jig for bonding the heat reversible recording medium on the card mentioned in the fifth or the sixth invention.

In the seventh invention, it is possible to lower the frictional resistance between the pressing means and the card and is possible to prevent the card from being damaged.

The eighth invention is characterized in that the pressing means is an overhang formed integrally together with the second plate in the jig for bonding the heat reversible recording medium on the card mentioned in the fifth or the sixth invention.

The eighth invention offers such bonding jigs which can be manufactured simply with a small number of parts at a low cost.

The ninth invention is characterized in that the card is put between the first and the second plates in a state where intensive pressure is applied to the card in the jig for bonding the heat reversible recording medium on the card mentioned in the fifth or the sixth invention.

In the ninth invention, the band-shaped heat reversible recording medium can be bonded firmly to the card in a state where its surface is flat by applying intensive pressure to this medium.

The tenth invention is a card reader-writer having a terminal and a thermal head. The terminal contacts with a contact for semiconductor devices, and the thermal head writes or erases the information in heat reversible recording media. The card reader-writer is disposed in order of the aforementioned terminal and the aforementioned thermal head from the card inserting direction and is disposed in the longitudinal direction for the card carrying face and on the identical extension along the card carrying direction.

In the tenth invention, the card reader-writer can read and write the electronic information recorded in semiconductor devices during a reciprocation of a card having a display at the identical extension of the back area corresponding to the contact for these semiconductor devices, can erase the information from the display, can print new information, and can check to see whether or not the information printed on the display and the electronic information recorded in the semiconductor devices accord with each other. Accordingly, it is possible to offer apparatuses having a high processing speed. It is also possible to offer apparatuses where IC of cards is not destroyed by the thermal head, because the thermal head does not bring into contact with the contact for the semiconductor devices. In addition, when the deformed card is used, it is possible to offer an apparatus which stably carries the card, because it is possible to reduce the convex portion of both ends of the card, and the card does not rub against the upper side of the carrying path. Besides, the stress is applied from the thermal head to the card 1 in the direction which is the opposite to the carrying direction, and is canceled by the carrying force applied to both ends of the card. For this reason, it is possible to offer apparatuses which can stably carry cards.

BEST FORMATION FOR EMBODYING INVENTION

The object of this invention is to solve the problem of the lowering of the printing quality of the edge in conventional technologies and the heavy economic burden associated with those technologies. In addition, the object of this invention is to offer cards to which display functions can be added freely and those whose display can be replaced with a new one when the frequency in use reaches its limit without any change of specifications of these cards which have already been in widespread use up to now.

To achieve the above objects, according to this invention, the band-shaped heat reversible recording medium (hereafter referred to as "Rewrite Tape") is bonded onto the card and is used as a display. In addition, in this invention, the rewrite tape is not bonded vaguely on an unspecified position of the card, but is bonded onto the optimum area specified as a bonding position, because the card has an area as a position stipulated by standard bodies such as JIS (Japanese Industrial Standard), ISO (International Standardization Organization), etc., or has an area liable to cause particularly convex and concave portions. Therefore, these areas are unsuitable for the display.

Also, the object of this invention is to offer peripheral technologies appendant to such cards.

The card of this invention and the rewrite tape supplied to the card are explained below by using FIGS. 1 to 4.

First, the card of this invention is explained. The JIS X 6301 and the JIS X 6302 for magnetic cards of JIS, JIS X 6303 for IC cards, etc., can be cited as specifications of cards which have widespread use up to now. Also, the JIS X 6301 and the JIS X 6302 are the same standards as ISO 7810 and the ISO 7811. "JIS-1" and "JIS-2" can be cited as cards based on these standards. The card of this invention conforms to JIS-2 as the first embodiment, and conforms to JIS-1 as the second embodiment.

Figure 1A:
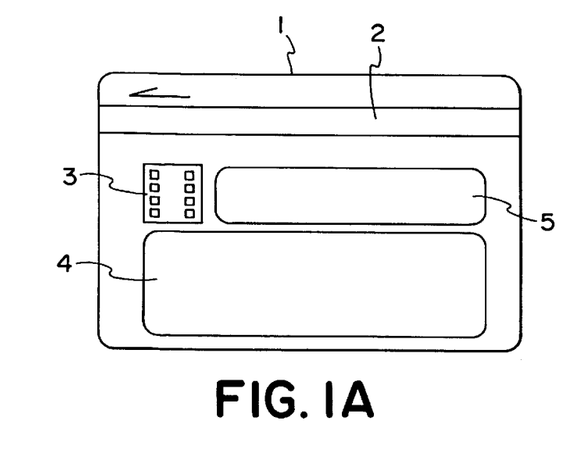
FIGS. 1A and 1B show a card according to a first embodiment of the card of this invention.
Figure 1B:
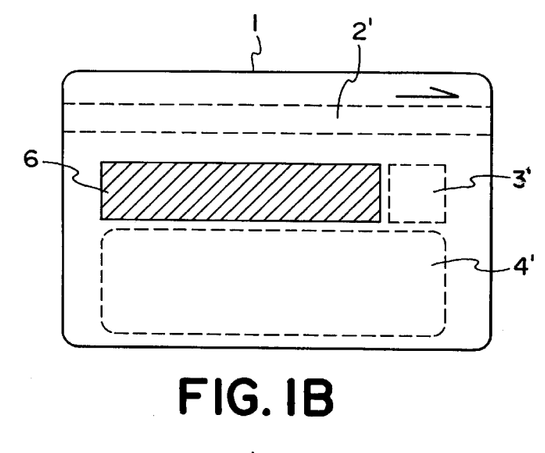
Figure 2A:
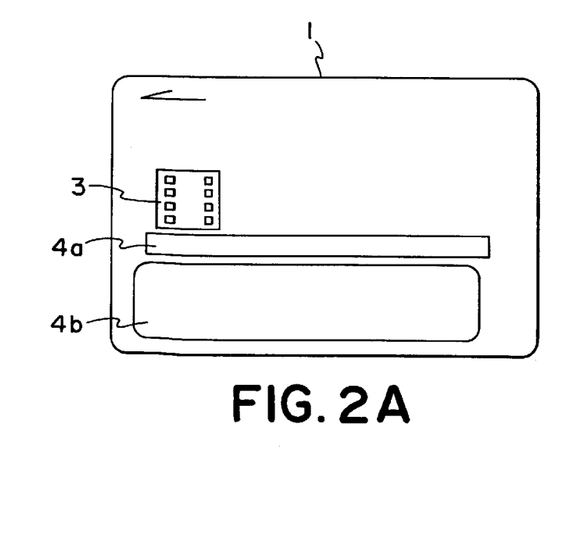
FIGS. 2A and 2B show a card according to a second embodiment of this invention.
Figure 2B:
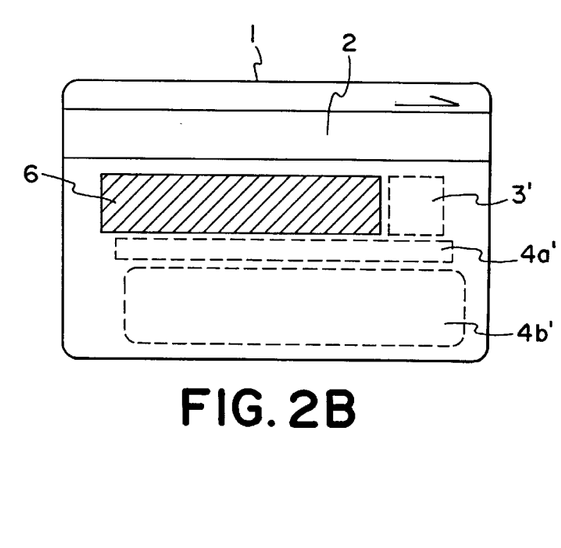
Figure 3A:
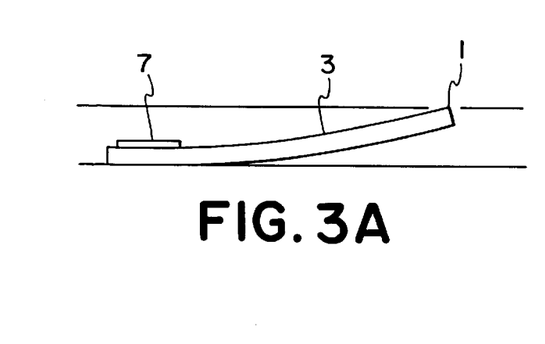
FIGS. 3A and 3B show a position for bonding a rewrite tape.
Figure 3B:
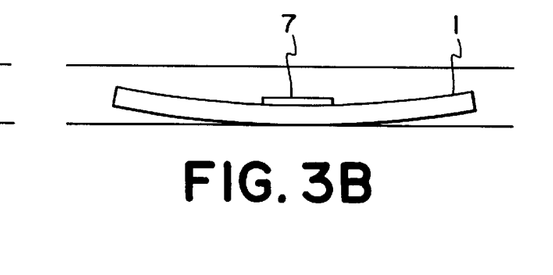

FIG. 1A shows the configuration of the surface of the card in the first embodiment, and FIG. 1B shows the configuration of the back of the card. Also, FIG. 2A shows the configuration of the surface of the card in the second embodiment, and FIG. 2B shows the configuration of the back of the card. FIGS. 3A and B show the position for bonding the rewrite tape. FIG. 3A shows a case when the rewrite tape is bonded onto the end of the card, and FIG. 3B shows a case when the rewrite tape is bonded onto the center of the card.

In FIGS. 1A, B and 2A, B, denoted by 1 is a card, denoted by 2 is a magnetic stripe,denoted by 2' is a back area of magnetic stripe, denoted by 3 is a contact for semiconductor devices such as IC, memory, etc. (hereafter referred to as "IC Contact"), denoted by 3' is a back area of IC contact, denoted by 4 is an embossed area, denoted by 4' is an embossed back area, denoted by 4a is a first embossed area, denoted by 4b is a second embossed area, denoted by 4a' is a first embossed back area, denoted by 4b' is a second embossed back area, denoted by 5 is a signature area, and denoted by 6 is a rewrite tape bonding area.

The first feature of the card of this invention lies in an IC contact being provided on different side or surface from that on which a rewrite tape is bonded. This is because when the card 1 is inserted in the card reader-writer mentioned later on, it is necessary to prevent IC contact 3 of the card 1 and the thermal head of the card reader-writer from bringing into contact with each other. That is, the contact between them may destroy the IC (not shown in any figure) of the card 1, because IC contact 3 has high thermal conductivity.

Also, the second feature of the card of this invention lies in the area for bonding the rewrite tape other than the back areas corresponding to the IC contact and the embossment. This is in order to enhance the printing quality. That is, even if the surface of the rewrite tape has minute convex and concave portions, the rewrite tape will be pressed and flattened with the thermal head which is a rigid body, and its surface will be smoothed, because as mentioned later on, the rewrite tape is elastic. Accordingly, the printing quality will be enhanced as long as the rewrite tape is bonded onto the flat area. In other words, the printing quality will be lowered when such a tape is bonded onto a convex or concave area. This is because when the support at the back side of the rewrite tape is convex or concave, a gap is caused between the rewrite tape and the thermal head, and the contact between them is not uniform. Then, it is necessary to bond the rewrite tape on the area of the card 1 other than areas (definitely speaking, back areas corresponding to the IC contact and the embossment) which lower the printing quality.

In addition, the third feature of the card of this invention is that the area for bonding the rewrite tape is a position other than magnetic stripe areas and back areas corresponding to the magnetic stripe areas. This is in order to smoothly read and write magnetic information in the magnetic stripes.

As mentioned above, the area for bonding the rewrite tape should be stipulated, and particularly the position shown in FIGS. 1 and 2 is optimum. This position is in substantially in the center of the card 1, abuts back area 3' of IC contact 3 and extends along the longitudinal direction of the card 1. As a result, the card 1 can be carried stably. Two reasons are explained below.

The first reason is as follows: two stresses can be canceled by the carrying force. One stress is applied from the thermal head to the card 1 in the carrying direction, and the other stress is done in the direction opposite to the carrying direction. That is, when the card 1 is carried, the rewrite tape and the thermal head will rub against each other. At this time, stress will be applied from the thermal head to the card 1 in the direction opposite to the carrying direction. When the rewrite tape is bonded onto substantially the center of the card 1, this stress will be canceled by the carrying force applied to both ends of the card 1, and the card 1 will be carried smoothly. As a result, the card reader-writer can carry the card 1 stably. However, when the rewrite tape is bonded onto the end of the card, this stress will not be canceled, and the card 1 will not be carried smoothly.

The second reason is that it is possible to prevent the end of the card 1 from rubbing against the upper face of the carrying path.

The card 1 may be deformed in daily use. FIG. 3A shows an example of the card 1 bent in the lateral direction. When a rewrite tape 7 is bonded onto the end of the bent the card 1, it is as shown in FIG. 3A. In this case, this end will be pressed to the lower face of the carrying path by means of the carrying roller and the thermal head, and another end will be floated and will rub against the upper face of the carrying path. Then, stress is applied to another end of the card 1 in the direction opposite to the carrying direction. Accordingly, the card 1 will not be carried smoothly. On the other hand, when rewrite tape 7 is bonded onto substantially the center of the bent the card 1, it is as shown in FIG. 3B. In this case, substantially the center of the card 1 will be pressed by the thermal head to the lower face of the carrying path. As a result, the degree of the floating of both ends of the card 1 is lower than that of the card 1 shown in FIG. 3A, and the both ends do not rub against the upper face of the carrying path. Accordingly, the card 1 can be carried smoothly.

Figure 4A:
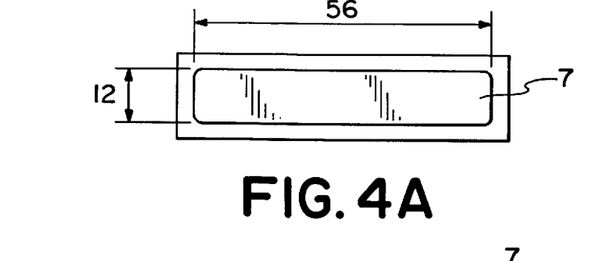
FIGS. 4A and 4B show a configuration of the rewrite tape in a top view and a section view, respectively.
Figure 4B:
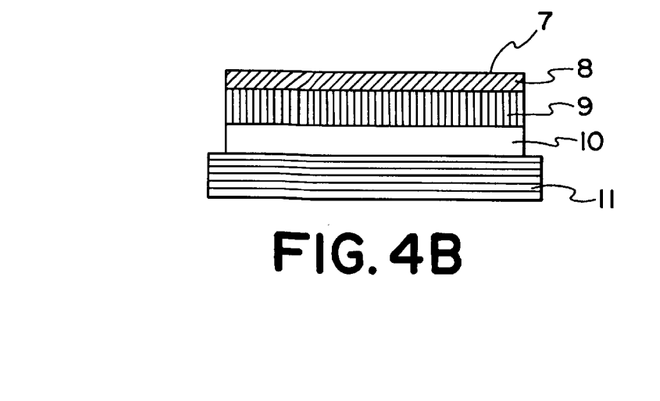

Next is the explanation of the rewrite tape 7 used in this invention. FIGS. 4A and 4B shows the configuration of the rewrite tape.

In FIGS. 4A and 4B, denoted by 7 is a rewrite tape, denoted by 8 is a rewrite layer, and denoted by 9 is a base material. Denoted by 10 is a bonding layer, denoted by 11 is a mounting paper. The rewrite tape 7 is based on the base material 9, and has rewrite layer 8 and the bonding layer 10 on the respective upper and lower layers of the base material 9. When the rewrite tape 7 is not used, the bonding layer 10 will be sealed with the mounting paper 11, and when the rewrite tape 7 is used, it will be torn from the mounting paper 11. Then, the rewrite tape 7 will be applied to the specified position of the card 1, will be bonded temporarily on the card 1, and will be pressed and bonded firmly thereon as it is. The rewrite tape 7 can play a role as a damper for the thermal head, because it is a flexible tape having high elasticity. When an adherent material is used in the bonding layer 10, the rewrite tape 7 can be bonded onto the card or torn therefrom repeatedly.

The rewrite tape 7 used in this invention is bonded onto the flat face of the card so that it is convex thereon. The following merits can be given to this invention by doing so. First, it is possible to better the contact between the rewrite tape 7 and the thermal head, because the rewrite tape 7 is convex on the bonding face of the card. Particularly, even when the card is deformed, if the rewrite tape 7 is convex only at, a specified height, it will be possible to better the above contact. Second, the rewrite tape 7 can be torn from the card and can be replaced readily with a new one, because it is only bonded onto the flat face of the card. Third, it is possible to prevent the contact between the card and the thermal head from being unbalanced by the warping, torsion, etc., of the card, because the rewrite tape 7 itself possesses a damping function. The rewrite tape 7 and the thermal head are brought into contact with each other in an appropriate state. As a result, when the information is written or erased in the card, it will be possible to better the printing quality without any generation of heat gradient.

Also, it is desirable to decide the dimension of the rewrite tape 7 bonded onto the card 1 so that the tape 7 can function sufficiently as a display in consideration of the size and the number of printed characters, the restriction of areas for bonding the above mentioned rewrite tape 7, etc. For example, the dimension (12×56 mm) shown in FIG. 4 was calculated in consideration of the above matters under the condition that the rewrite tape 7 is bonded onto the card (which conforms to JIS-1 or ISO) of the second embodiment. If the rewrite tape 7 is prepared on the basis of the above dimension, it will be able to function sufficiently as a display for the card of the second embodiment.

It is also desirable to decide the thickness of the rewrite tape 7 so that the rewrite tape 7 and the thermal head can be brought completely into contact with each other and the rewrite tape 7 can be torn readily from the card 1. In addition, as previously mentioned, even when the card is deformed, its surface is convex only at the specified height, it will be possible to better the contact between the rewrite tape 7 and the thermal head, so it is desirable to consider this matter. For example, a thickness of 50 to 100 µm or so will satisfy these conditions.

It is also permissible to make a groove in the face of the card 1 for bonding the rewrite tape 7 and to engage the rewrite tape 7 with the groove so that the tape 7 is protruding from the face. In this case, it is difficult to tear the rewrite tape 7 from the card 1, because the bonding layer 10 of the tape 7 is embedded in the card, but it is possible to obtain the printing quality equivalent to that in the case of the flat face.

Next, a jig for bonding the rewrite tape 7 on the card, which is an embodiment of this invention, is explained now with reference to FIGS. 5 to 9. This jig is an embodiment of this invention.

Figure 5:
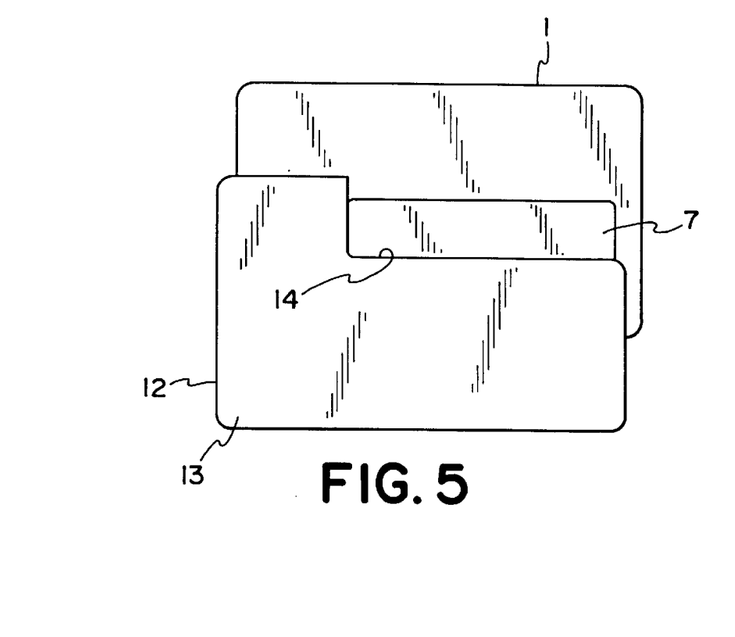
FIG. 5 is a front view showing the combination of the card and a jig for bonding the rewrite tape.
Figure 6:
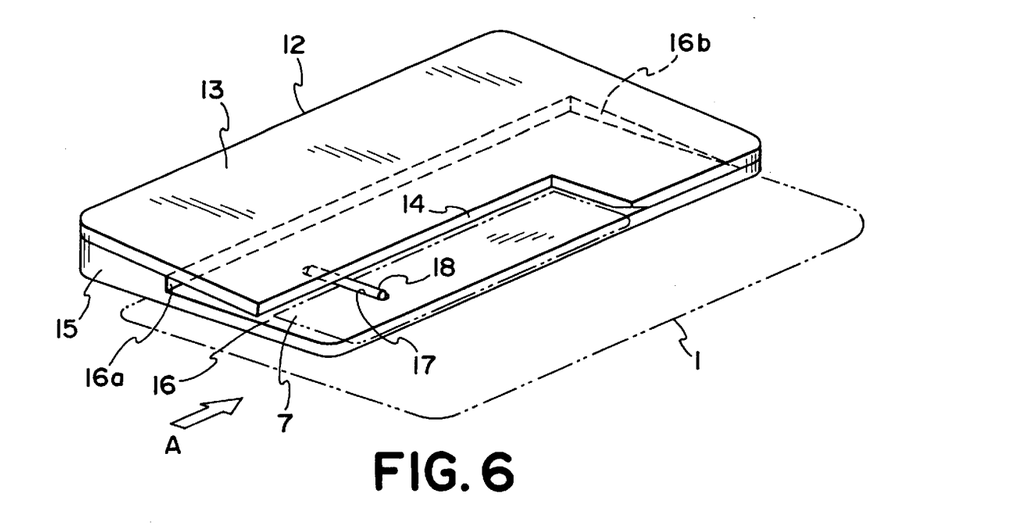
FIG. 6 is a perspective view showing the combination of the card and the jig for bonding the rewrite tape.
Figure 7A:
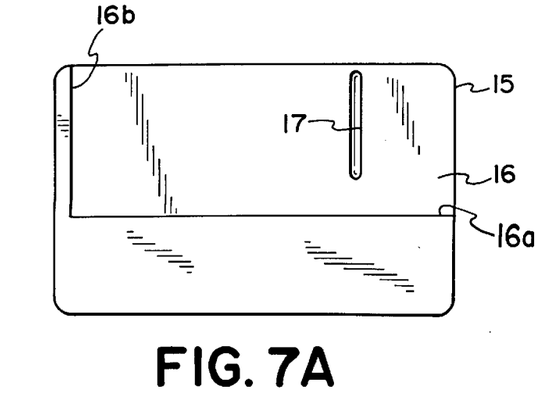
FIGS.7A,7B and 7C show the configuration of a first plate of the jig for bonding the rewrite tape of this invention.
Figure 7B:
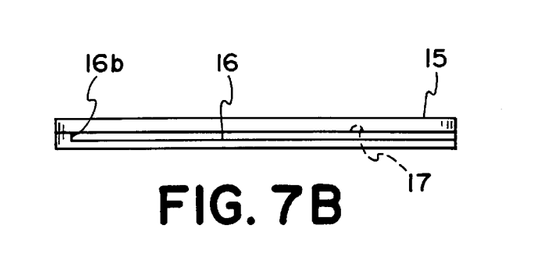
Figure 7C:
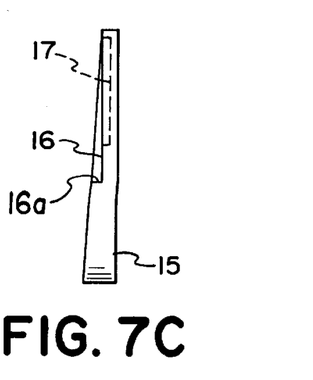
Figure 8A:
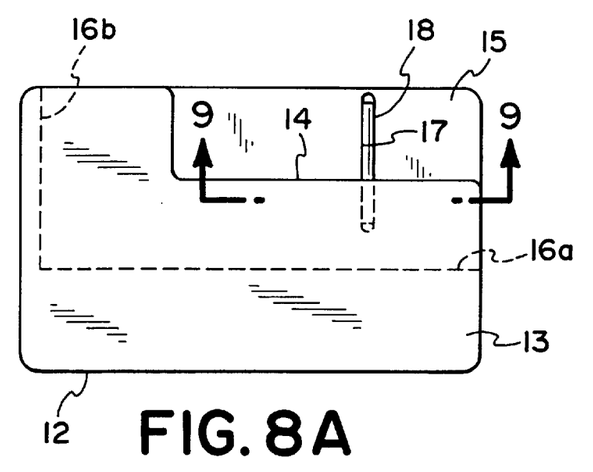
FIGS. 8A, 8B and 8C show the configuration of the jig for bonding the rewrite tape of this invention.
Figure 8B:
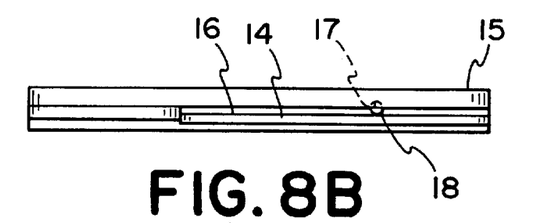
Figure 8C:
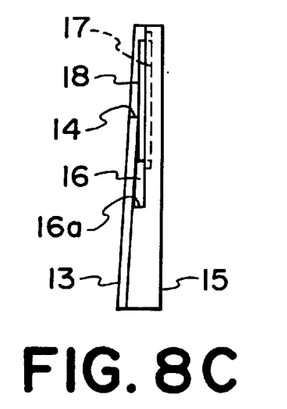
Figure 9:
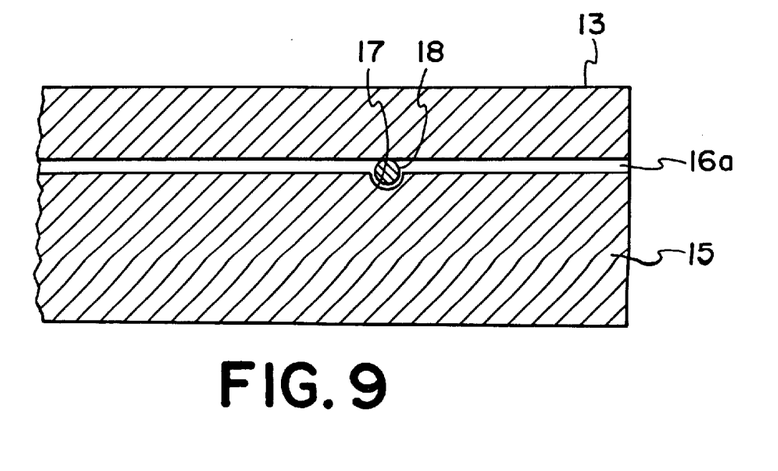
FIG. 9 is an exploded sectional view of the jig for bonding the rewrite tape of this invention.

FIG. 5 is a front view which shows the combination of the card and the jig for bonding the rewrite tape 7. FIG. 6 is a perspective view which shows the combination of the card and the jig for bonding the rewrite tape 7. FIGS. 7A, B and C show the configuration of the second plate of the jig for bonding the rewrite tape 7. FIGS. 8A, B and C show the configuration of the jig for bonding the rewrite tape 7. FIG. 9 is an expanded sectional view along 9—9 of the jig for bonding the rewrite tape 7 as shown in FIG. 8A.

FIG. 7A is a plan view of the second plate 15 of the bonding jig according to the invention. FIG. 7B is a side view taken from direction B. FIG. 7C is another side view taken from direction C as shown in FIG. 7A. of the jig for bonding the rewrite tape 7 as shown in FIG. 8A.

In FIGS. 5 to 9, denoted by 12 is a jig 12 for bonding the rewrite tape 7, denoted by 13 is a first plate. Denoted by 14 is a notch. Denoted by 15 is a second plate. Denoted by 16 is a first groove, denoted by 6a is a first stopper and denoted by 16b is a second stopper. Denoted by 17 is a second groove. Denoted by 18 is a roller. The jig 12 for bonding the rewrite tape 7 of this invention consists of two joined plates and is used by putting the card 1 between the plates. Jig 12 and is almost the same as the card 1 in size.

FIG. 8A is a plan view of bonding jig 12. FIGS. 8B and C are respective side views taken from directions B and C as shown in FIG. 8A. The notch 14 is provided at a specified position of the upper plate of the above two joined plates. The notch 14 is a means of stipulating the position for bonding the rewrite tape 7 on the card.

The lower plate 15 of the above joined plates are formed so that its transverse cross section is trapezoidal, and is joined with the upper plate 13 at a part of the slant of the trapezoid. This structure enables the jig 12 to apply intensive pressure to the card 1 put between the plates 13 and 15. That is, when the card 1 is put between the plates 13 and 15, the plate 13 will warp backward. This warping force will generate the righting moment from the plate 13. As a result, the plate 13 will have spring properties and will apply intensive pressure to the card 1 put between the plates 13 and 15.

Also, the groove 16 engaged with the card 1 is made at the trapezoidal slant of the plate 15. The end face (hereafter referred to as "Stopper 16a") of the groove 16 in the longitudinal direction and that (hereafter referred to as "Stopper 16b") of the groove 16 in the lateral direction are stoppers which control the movement of the card 1. These stoppers 16a and 16b are provided on a specified position in consideration of the relative relationship with the notch 14 of the plate 13. The relative relationship means that when the card 1 is engaged with the groove 1.6 along the stoppers 16a and 16b, the notch 14 will accord with the periphery of the area 6 for bonding the rewrite tape 7 of the card 1.

In addition, the second groove 17 having a specified length is made in the groove 16 of the plate 15, and the roller 18 having the specified length is engaged in the groove 17. As shown in FIG. 9, the roller 18 is set so that it does not slip from the groove by the pressure from the plates 13 and 15. This roller is a pressing means which applies intensive pressure to the rewrite tape 7 bonded temporarily on the card 1 and which firmly and flatly bonds the rewrite tape 7 thereon.

The method of using the jig 12 for bonding the rewrite tape 7 is explained now. The jig 12 for bonding the rewrite tape 7 of this invention is designed to temporarily set the rewrite tape 7 at the specified position of the card 1. First, the card 1 is inserted in the groove 16 of the jig 12 for bonding the rewrite tape 7 from the direction of an arrow "A". At this time, the card 1 conforming to JIS or ISO is inserted from the IC contact 3 in a state where the back face of this contact is upward. Next, the card 1 is transferred along the stopper 16a of the groove 16. When the card 1 reaches the position of the stopper 16b, it will be stopped with the stopper 16b. The rewrite tape 7 is applied to the card 1 along the notch 14 in the above state. Therefore, the rewrite tape 7 is bonded temporarily on the specified position of the card 1.

The rewrite tape 7 is bonded firmly on the card by applying intensive pressure to the rewrite tape 7. The jig 12 for bonding the rewrite tape 7 of this invention is designed so that the rewrite tape 7 can be bonded firmly and flat on the card by applying intensive pressure to the rewrite tape 7. First, the card 1 is pulled out of the jig 12 for bonding the rewrite tape 7, is turned over, and is inserted in the groove 16 of the jig from the direction of an arrow "A". At this time, the card 1 is inserted therein in a state where the surface of the IC contact 3 is upward from the opposite direction of this IC contact. Next, the card 1 is transferred along the stopper 16a of the groove 16. At this time, intensive pressure is applied to the rewrite tape 7 by way of the roller 18 from the plates 13 and 15. Accordingly, the rewrite tape 7 is bonded firmly and flatly on the card 1. Also, the reason why the roller is used as a pressing means is that it is possible to lower the frictional resistance between the pressing means and the card. The above structure enables the jig to smoothly insert the card in the groove.

The following functions can be realized with the above simple structure, namely, the jig can temporarily bond the rewrite tape 7 on the specified position of the card, and the jig can apply intensive pressure to the rewrite tape 7 and can bond the tape 7 firmly and flat on the surface of the card. Also, the jig can be supplied at a low cost, because it has a small number of parts and can be assembled simply. In addition, it is handy and portable, because it is almost the same as the card 1 in size.

Also, it is possible to variously change the jig.

For example, it is permissible to round off the corner of the end of the notch 14 in the lateral direction, because if the corner is not rounded off, when the card 1 is transferred along the stopper 16a, the end will bring into contact with the card. At this time, when the resistance between this corner and the card 1 is large, it will be difficult to transfer the card to the inner part. Then, for example, as shown in FIG. 5, when the corner of the end is rounded off in the lateral direction of the notch 14, it will be possible to lower the resistance between the corner and the card 1. This system enables the jig 12 for bonding the rewrite tape 7 to smoothly transfer the card 1 to the inner part.

Also, the first and the second plates can be formed integrally. In addition, the second plate and the pressing means can be formed integrally. Besides, the identical effect can be obtained by trapezoidally forming not the second plate but the groove. The jig structured on the basis of the above mentioned is explained below.

Figure 10A:
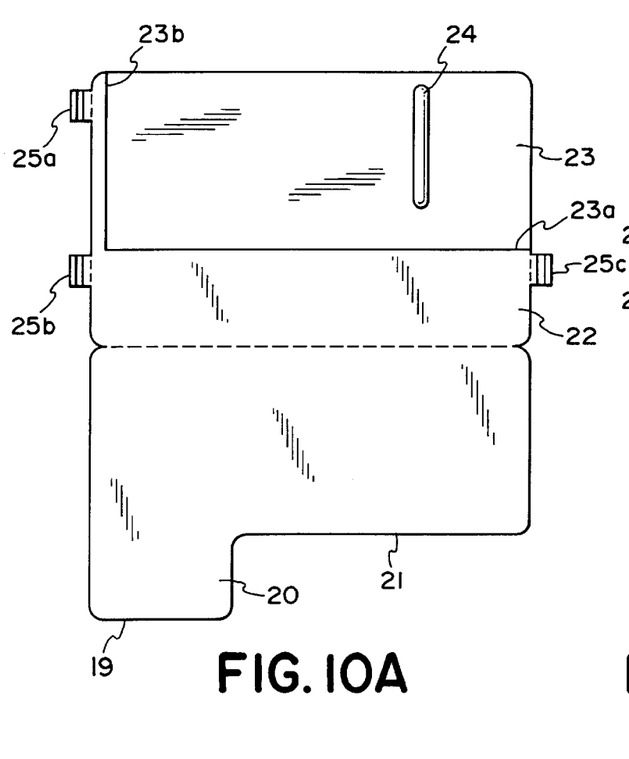
FIGS. 10A, 10B and 10C show the configuration of another embodiment of the jig for bonding the rewrite tape of this invention.
Figure 10B:
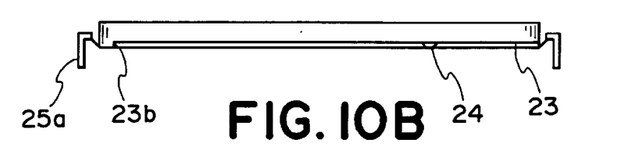
Figure 10C:
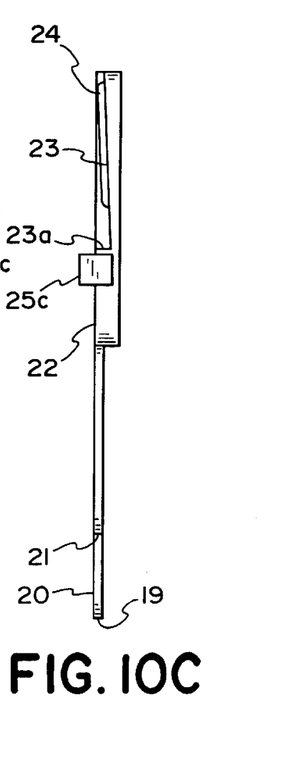

FIGS. 10A, B and C show the structure of another embodiment of the jig for bonding the rewrite tape 7. FIG. 10A is a plan view of an open bonding jig 12. FIGS. 10B and C are respective side views taken from directions B and C as shown in FIG. 10A.

In FIGS. 10A, B and C, denoted by 19 is a jig for bonding the rewrite tape 7. Denoted by 20 is a first plate. A notch is denoted by notch 21. 22 denotes a second plate. 23 denotes a groove. Denoted by 23a is a first stopper, and 23b denotes a second stopper. Denoted by 24 is a protrusion. 25a, 25b, and 25c denotes claws.

The jig 19 for bonding the rewrite tape 7 is formed integrally together with the plates 20 and 22 made of synthetic resin. The jig 19 is folded up at the boundary between the plates 20 and 22, and fixed as a complete body. There are various kinds of methods of fixing the plates 20 and 22. For example, FIGS. 10A, B and C show a method of using the claws 25a, 25b, and 25c. These claws 25a, 25b, and 25c are members formed integrally together with the plate 22, and are folded up so that they are applied to the outside of the plate 22 at the boundary between the plates 20 and 22. Accordingly, the claws fix the plates. Another methods of fixing these plates are as follows, namely, for example, a part of the inside of the plate 22 are heated, melted, and folded up at the boundary between the plates 20 and 22, an adhesive is applied to the inside of the plate 20 or the plate 22, and convex and concave portions are made on the inside of the plates 20 and 22 and are engaged with each other. The jig 19 structured as above can be assembled simply, and the number of parts is small.

In FIG. 10C, the jig 19 has the protrusion 24 as a pressing means in the groove 23. The protrusion is formed integrally together with the second plate 22. The jig 19 having such a structure requires a small number of parts.

FIG. 10C shows that the groove 23 of the jig 19 slopes so that stopper 23a is deep. When the card 1 is inserted in the groove 23, the plate 20 will be warped backward, and the lighting moment will be generated from the plate. Accordingly, it is possible to obtain the same effect as that in the case of a trapezoid, even if the second plate is not formed trapezoidally. The jig structured as above is flat-shaped and handy. Accordingly, it is handier and more portable than the jig 12 (the second plate is trapezoidal-shaped) for bonding the rewrite tape 7 of the first embodiment.

Figure 11:
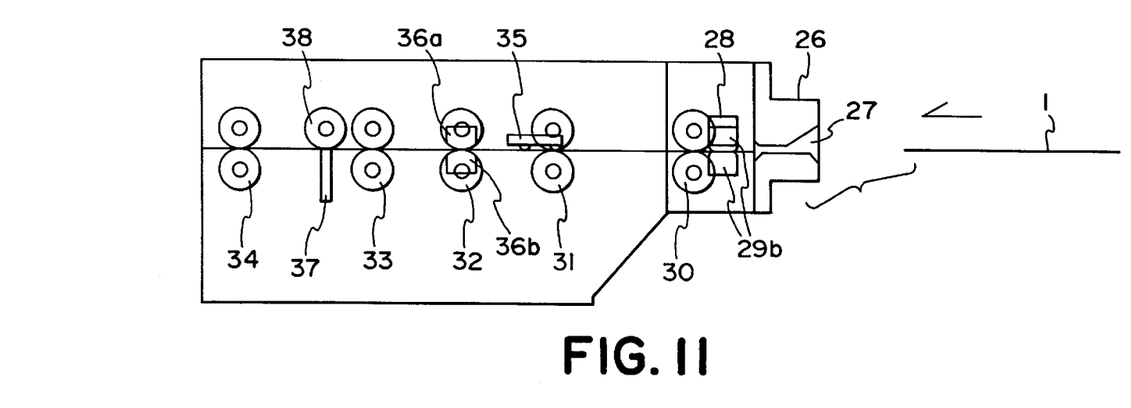
FIG. 11 is a side view of the card reader-writer of this invention.
Figure 12:
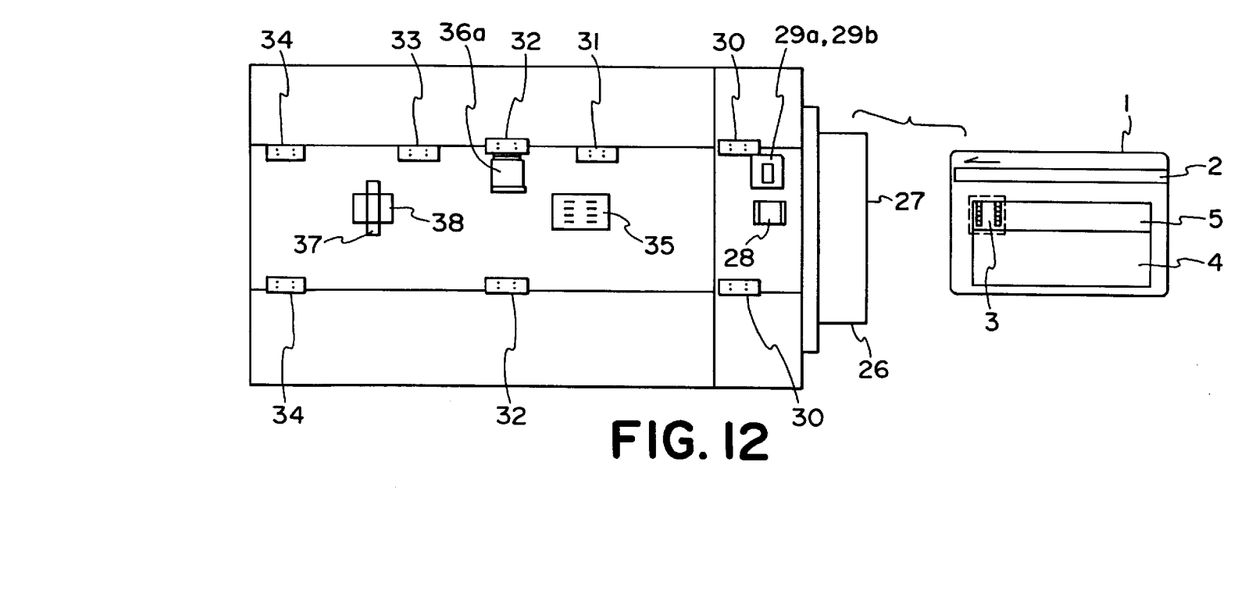
FIGS. 12A and 12B is a plan view of the card reader-writer of this invention.

Next, the card reader-writer of this invention is explained now with reference to FIGS. 11 and 12A and B.

FIGS. 11 and 12A and B are views (side and plan views) which show the configuration of the card reader-writer of this invention. FIG. 12A shows a plan view of card reader-writer 26 and FIG. 12B shows card 1 as it is inserted into card insertion opening 27.

In FIGS. 11 and 12A, denoted by 26 is a card reader-writer.

This card reader-writer 26 of this invention is designed in consideration of how can the speed for processing the card 1 be enhanced and how can the card 1 be carried stably without any destruction of IC of the card. The features lie in the following items, namely, the IC contact connecting terminal and the thermal head are set on the card in this order from the card inserting direction, and the IC contact connecting terminal and the thermal head are set up and down with respect to a card carrying face and arranged on the identical extension along the card carrying direction.

In FIGS. 11 and 12A, denoted by 27 is a card insertion opening, 28 denotes an IC contact detecting sensor which detects whether the card 1 is an IC card or not. 29a denotes a magnetic stripe detecting sensor which detects whether the card 1 conforms to JIS-2 or not. Denoted by 29b is a magnetic stripe detecting sensor which detects whether the card 1 conforms to JIS-1 or not. 30 to 34 denote carrying rollers. 35 denotes an IC contact connecting terminal. 36a and 36b denote magnetic heads. Denoted by 37 is a thermal head. 38 denotes a platen roller which allows the card 1 to closely contact the thermal head 37.

A carrying path is formed in the card reader-writer 26 to carry the card 1 inserted from the insertion opening 27. The IC contact detecting sensor 28, the magnetic stripe detecting sensors 29a and 29b, the IC contact connecting terminal 35, the magnetic heads 36a and 36b, and the thermal head 37 are set in order from the insertion opening 27 along this carrying path. The card reader-writer 26 carries the card 1 to them by way of the carrying rollers 30 to 34.

The operation of the card reader-writer 26 is explained now. First, when the card 1 is inserted from the insertion opening 27, the magnetic stripe detecting sensors 29a and 29b will detect which standard does the card 1 conform to, and the card reader-writer 26 will read the magnetic information recorded in the magnetic stripe 2 of the card. Next, the card reader-writer 26 will connect the IC contact connecting terminal 35 to the IC contact 3 of the card 1, will read the electronic information recorded in the IC of the card 1, and will write new electronic information. After that, the card reader-writer 26 will erase the information displayed on the rewrite tape 7 of the card 1 through the thermal head 37, and will print the information which should be newly displayed. Subsequently, the card reader-writer 26 will again connect the IC contact connecting terminal 35 to the IC contact 3 of the card 1, and will check to see whether or not the information printed on the rewrite tape 7 agrees with the electronic information written in IC of the card 1. When the two informations are in agreement with each other, the card reader-writer 26 will discharge the card 1 from the insertion opening 27, but if not so, the card reader-writer 26 will repeat the above operation. That is, when a result of checking the card is good, the card reader-writer 26 will discharge the card from the insertion opening, but when the result is bad, the card reader-writer 26 will print an abnormality of the card on the rewrite tape 7 and will discharge the card therefrom.

The card reader-writer 26 of this invention is characterized in that the IC contact connecting terminal 35 and the thermal head 37 are set in this order from the card inserting direction. The card reader-writer 26 structured as above can read the electronic information recorded in IC of the card 1 and can write new electronic information during a reciprocation of the card, can erase the information displayed on the rewrite tape 7 and can print the information which should be displayed newly thereon, and can check to see whether or not the information printed on the rewrite tape 7 accords with the electronic information written in IC of the card. As a result, the card reader-writer 26 can enhance the processing speed. Also, the card reader-writer 26 of this invention is characterized by that it is set so that the IC contact connecting terminal 35 and the thermal head 37 are arranged to be separated from each other with respect to the carrying face. The card reader-writer 26 is designed so that the thermal head and the IC contact of the card 1 do not bring into contact with each other. As a result, it is possible to prevent the IC of the card a from being heated and destroyed by the thermal head 37. In addition, the card reader-writer of this invention is characterized by that the IC contact connecting terminal and the thermal head are set on the identical extension of the carrying direction. The card reader-writer 26 is designed so that it is suitable for the area 6 for bonding the rewrite tape 7 of the card 1 shown in FIG. 3B mentioned previously. Therefore, even if the card 1 is deformed as shown in FIGS. 3A and B, it is possible to reduce the floating of both ends of the card. As a result, it is possible to prevent the both ends from rubbing against the carrying path. Also, when the rewrite tape 7 and the thermal head 37 rub against each other, stress will be generated in the direction opposite to the carrying direction. This stress will be canceled by the carrying force applied to both ends of the card 1, because the stress is applied to substantially the center of the card 1. As a result, the card reader-writer 26 can stably carry the card.

This invention explained above has the following effects.

The position other than the following areas is specified in the first invention, namely, an area optimum for the position for bonding the rewrite tape 7 which is a display, i.e., back area corresponding to the IC contact at the back of the face on which the IC contact is provided, the area for the magnetic stripe or back area corresponding to the area, and the back area corresponding to the embossment.

In the first invention, it is possible to better the contact between the rewrite tape 7 and the thermal head, and particularly, even if the card is deformed, when a convex portion is formed only at a specified height on the deformed card, it will be possible to better the above contact. Also, a flat face can be selected by specifying a position for bonding the rewrite tape 7. Therefore, it is possible to prevent the gap from being generated between the rewrite tape 7 and the thermal head, and to enhance the printing quality. Also, the IC of the card is not destroyed, and there is no trouble in reading and writing the information in the magnetic stripe. In addition, display functions can be added freely in cards without any change of the specification of these cards which are presently in widespread use.

The second invention is characterized in that the position for bonding the rewrite tape 7 in the card of the first invention is an identical extension of the back area corresponding to the IC contact along the longitudinal direction of the card.

In the second invention, when the position for bonding the rewrite tape is further specified, even if the card is deformed, both ends of the card will not rub against the carrying path, because the degree of the floating at both ends is low. Also, even if the rewrite tape and the thermal head bonded onto the card rub against each other and a stress is applied to the card in the direction opposite to the carrying direction, this stress will be applied to substantially the center of the card. Even in this case, the card will be carried smoothly, because this stress will be canceled by the carrying force applied to both ends of the card. Accordingly, the card reader-writer can stably carry the card, and the rewrite tape is appropriate as a display.

The third invention is characterized by the rewrite tape in the card of the first invention having a heat reversible recording layer and an adherent bonding layer on the respective upper and lower layers of the base material and is bonded onto the flat bonding face of the card so that the rewrite tape is convex thereon.

In the third invention, it is possible to better the contact between the rewrite tape and the thermal head by bonding the rewrite tape on the card so that this tape is convex on the flat bonding face of this card. Particularly, even if the card is deformed, when a convex portion is formed only at the specified height on the card, it will be possible to better the contact between the rewrite tape and the thermal head. Also, when information is erased from the display or is printed thereon, it will be possible to prevent heat from escaping from the edge, and to prevent the heat gradient from being generated from the edge. The rewrite tape can be torn readily from the card, because its bonding layer is adherent and it is protrusive from the flat bonding face of the card. When the number of uses of a rewrite tape reaches its limit, the rewrite tape can be replaced readily with a new one. Therefore, it is unnecessary to replace the card itself with a new one, and the economic burden can be lightened.

The fourth invention is characterized in that the rewrite tape is elastic in the card of the first invention.

In the fourth invention, it is possible to prevent the card and the thermal head from unevenly being brought into contact with each other due to the warp, torsion, etc., of the card, and is possible for the rewrite tape and the thermal head to be brought into contact with each other in an appropriate state, because the rewrite tape itself functions as a damper. Therefore, when information is erased from the rewrite tape or is written thereon, it will be possible to enhance the printing quality without any generation of heat gradient.

The fifth invention is a jig for bonding rewrite tapes, and the jig has a first plate having a notch, and a second plate having a pressing means for crimping rewrite tapes. This invention is characterized in that the jig is fixed in a state where the first and second plates are bonded to each other so that the pressing means of the second plate is inside.

In the fifth invention, it is possible to realize the following functions, because the jig has a simple structure, namely, the rewrite tape can be bonded temporarily on the specified position of the card, and the rewrite tape can be bonded firmly and flatly on the surface of the card by applying intensive pressure to the rewrite tape. Also, the jig has a small number of parts, can be assembled simply, and can be supplied at a low cost. In addition, the jig is handy and portable, because it is almost the same as the card in size.

The sixth invention is a jig for bonding rewrite tapes, and the jig has the first plate having a notch, and the second plate having a pressing means for crimping rewrite tapes. The first and second plates are formed integrally in the jig. This invention is characterized in that the jig is fixed in a state where the first and second plates are folded so that the pressing means of the second plate is inside.

In the sixth invention, the number of parts for the jig is smaller than that of the fifth invention, and this jig can be manufactured simply and can be supplied at a low cost, because the two plates are formed integrally in the jig.

The seventh invention is characterized by pressing means being a roller in the jig for bonding rewrite tapes of the fifth or the sixth invention.

In the seventh invention, it is possible to lower the frictional resistance between the pressing means and the card, to prevent the card from being damaged, and to smoothly insert the card.

The eighth invention is characterized in that the pressing means is a protrusion formed integrally with the second plate in the jig for bonding rewrite tapes in the fifth or the sixth invention.

In the eighth invention, the number of parts is small, and the jig can be manufactured simply and can be supplied at a low cost.

The ninth invention is characterized in that a card is put between the first and the second plates to which intensive pressure is applied in the jig for bonding rewrite tapes of the fifth or the sixth invention.

In the ninth invention, the rewrite tape can be bonded firmly and flat on the surface of the card by applying intensive pressure to this tape.

The tenth invention is a card reader-writer having an IC contact connecting terminal and a thermal head which writes or erases the information in the rewrite tape. This invention is characterized in that the aforementioned terminal and thermal head are set in this order from the card inserting direction, and are arranged up and down with respect to the card carrying face and on the identical extension along the card carrying direction.

In the tenth invention, first the card reader-writer can read the electronic information recorded in IC of the card and can write new electronic information during a reciprocation of the card, can erase the information displayed in the rewrite tape and can print the information which should be displayed newly, and can check to see whether or not the information printed in the rewrite tape accords with the electronic information written in the IC of the card. As a result, the card reader-writer can enhance the processing speed. Second, the card reader-writer is designed so that the thermal head and the IC contact of the card do not bring into with each other. As a result, it is possible to prevent the IC of the card from being heated and damaged by the thermal head. Third, the card reader-writer can lower the degree of the floating on both ends of the card, even if the card is deformed. As a result, it is possible to prevent the both ends from rubbing against the carrying path. Also, when the rewrite tape and the thermal head bring into contact with each other, a stress will be generated in the direction opposite to the carrying direction, will be applied to substantially the center of the card, and will be canceled by the carrying force applied to the both ends of the card. Accordingly, the card reader-writer can stably carry the card.

We claim:

1. A card having a band-shaped heat reversible recording medium bonded onto a specified position thereof, said card comprising:

a front surface, an IC contact for semiconductors, and an embossed area provided on said front surface;

a back surface, the heat reversible recording medium bonded on said back surface and including a heat reversible recording layer on an upper layer of a base material and a bonding layer on a lower layer of the base material, said heat reversible recording medium bonded onto a flat bonding face of the card so that the heat reversible recording medium is convex on the bonding face of the card; and a magnetic stripe located on one of the front surface and back surface of the card, wherein the bonding position of the heat reversible recording medium avoids areas on the back surface of the card which correspond to areas on the front surface where the IC contact and embossed area are provided and avoids one of the magnetic stripe and an area on the back surface corresponding to the location of the magnetic stripe on the front surface.

2. A card according to claim 1, wherein the bonding position abuts the back area corresponding to the front area where the IC contact is provided, said bonding position extending along a longitudinal direction of the card.

* * * * *